United States Patent

[11] 3,600,611

| [72] | Inventor | Richard W. Treharne<br>Xenia, Ohio |
|---|---|---|
| [21] | Appl. No. | 20,527 |
| [22] | Filed | Mar. 18, 1970 |
| [45] | Patented | Aug. 17, 1971 |
| [73] | Assignee | Kettering Scientific Research, Inc.<br>Yellow Springs, Ohio |

[54] ELASTO-OPTIC DEVICE WITH MECHANICAL BIAS
7 Claims, 4 Drawing Figs.

[52] U.S. Cl. ........... 310/8.2, 250/199, 310/8.1, 310/8.3, 310/9.4, 350/149, 350/157, 350/161
[51] Int. Cl. ........... H01v 7/00, G02f 1/24
[50] Field of Search ........... 350/149, 157, 161; 250/199; 310/8, 8.1, 8.2, 8.3, 8.7, 9.1

[56] References Cited
UNITED STATES PATENTS

| 1,954,947 | 4/1934 | Pajes | 350/149 |
|---|---|---|---|
| 2,313,349 | 3/1943 | Land | 350/149 |
| 2,418,964 | 4/1947 | Arenberg | 350/149 X |
| 2,622,470 | 1/1948 | Rines | 310/8.2 |
| 2,623,165 | 12/1952 | Mueller | 350/149 X |
| 2,707,749 | 5/1955 | Mueller | 350/149 X |
| 2,766,659 | 10/1956 | Baerwald | 350/150 |
| 3,439,974 | 4/1969 | Henry et al. | 350/149 |

*Primary Examiner*—Milton O. Hirshfield
*Assistant Examiner*—Mark O. Budd
*Attorney*—Marechal, Biebel, French and Bugg ABSTRACT: A device for modulating the intensity of a beam of light includes a pair of polarizing filters, the polarization plane angles of which are crossed, and a fused quartz light transmitting element mounted between the polarizing filters with its preferred axis oriented at 45° to the filters. The element is made to exhibit birefringence by mechanical stress imposed by a piezoelectric device mechanically attached to one side of the element. A second piezoelectric device is attached to the other side of the element, and supplies an output to control the frequency of an oscillator circuit to maintain the frequency of oscillation of the assembly at resonance. The light transmitting element and the piezoelectric devices are mounted in a metal ring which is provided with an adjustment so that mechanical force may be applied to the element through the piezoelectric devices to bias the element thereby producing a quarter wave retardation which improves the efficiency of the device.

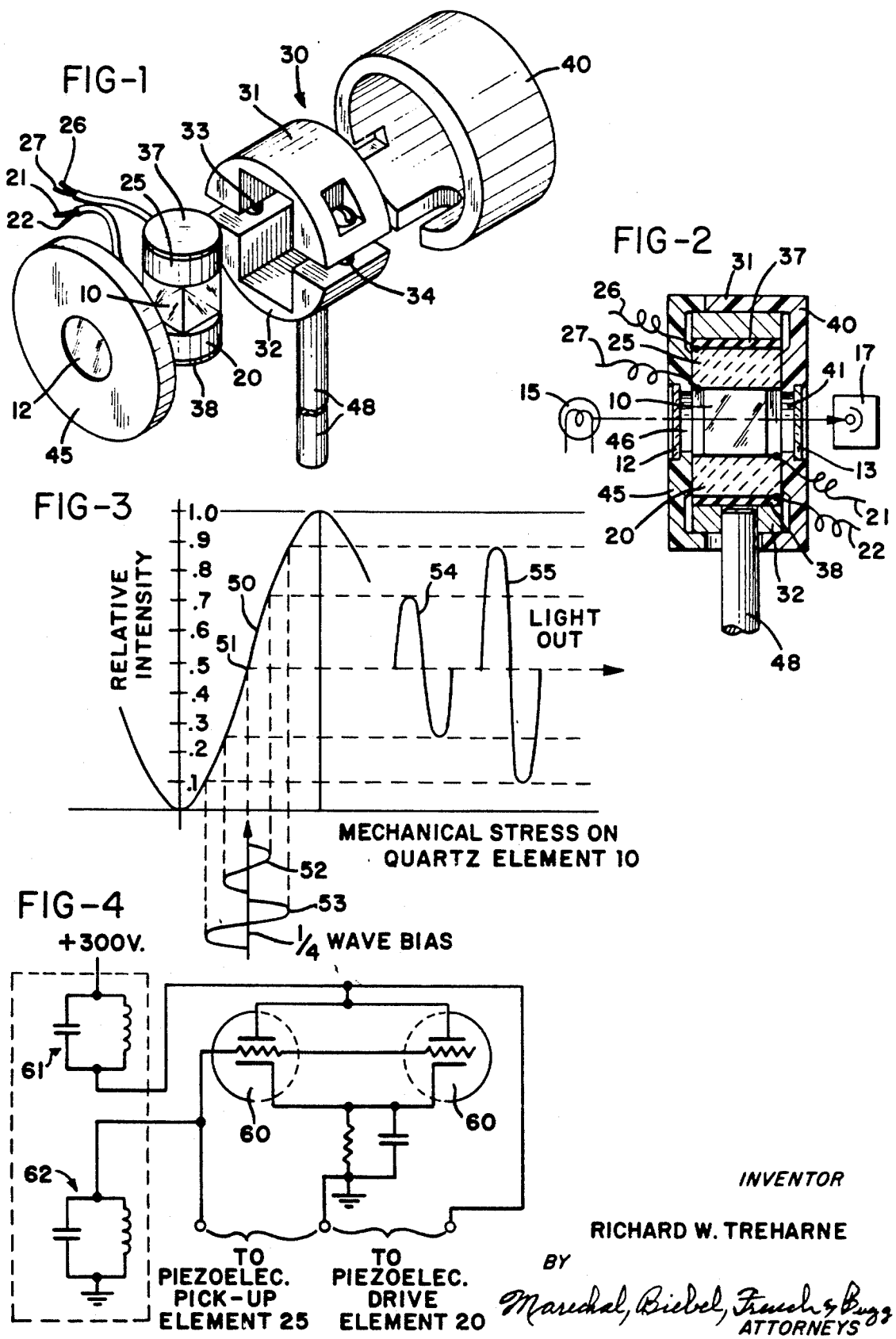
INVENTOR
RICHARD W. TREHARNE ated "Rapid Scanning Spectrophotometer," now U.S. Pat. No. 3,521,958, issued July 18, 1970. Other uses for the device, such as for light communications systems, will be readily apparent to those skilled in the art.

3,600,611

ELASTO-OPTIC DEVICE WITH MECHANICAL BIAS

BACKGROUND OF THE INVENTION

This invention relates to an elasto-optic device in which the birefringent characteristic of an isotropic material, such as a fused quartz element, is utilized to vary the polarization plane angle of a beam of light which is transmitted through the element.

When stress is applied to a fused quartz cube, it can be made birefringent and the retardation for a given wavelength and plate thickness will vary according to the stress applied and will be dependent upon the stress-optic constant of the material. It has been known to apply mechanical stress to a fused quartz plate by using acoustical generators, such as piezoelectric devices, and by observing the birefringence created by placing the plate between crossed polarizers and measuring the variations in the light energy transmitted through the assembly as a function of the stress applied to the plate.

It is also known that the resonant frequency of a given quartz plate will vary with temperature, and in order to maintain the frequency of the applied acoustical wave at the resonant frequency of the plate, a signal detecting means, which may also be a piezoelectric device, is attached to the quartz plate on the side opposite the signal generating means, with the signal output of the detecting means controlling the frequency of the oscillator which drives the signal generating transducer. By maintaining the input oscillating frequency at resonance, the greatest modulation efficiency of the assembly is obtained.

Assemblies of devices incorporating a piezoelectric transducer which modulate a fused quartz plate are described in U.S. Pat. No. to Mueller 2,707,749 and an article entitled "A Modulator of Birefringence" by Billardon and Badoz, C. R. Acad. Sc. Paris, t. 262 (27 June 1966). Series B, p. 1672. In the Mueller patent, a light transmitting plate is mounted between crossed polarizing filters and the plate has attached thereto a piezoelectric transducer. A detecting device is included for the declared purpose of maintaining frequency of the modulating input at the resonant frequency of the assembly. In the Billardon and Badoz article, a device for measuring circular dichroism is shown and includes a quartz bar having piezoelectric transducers attached to each end. Inertial masses are secured to the transducers to insure that sufficient acoustical energy is transmitted into the quartz plate. A third transducer senses the mechanical vibrations within the assembly and produces a voltage used to control the frequency of an oscillator supplying power to the other transducers.

SUMMARY OF THE INVENTION

In the present invention, a birefringent light modulating element, such as a quartz plate, is mounted in the optical path between two crossed polarizing filters, a modulating device (which includes a piezoelectric crystal) is attached to one side of the quartz plate, and a signal detecting piezoelectric crystal is attached to the other side of the quartz plate. This assembly is mounted in a steel ring and a constant mechanical pressure is then imposed on the quartz plate through the piezoelectric devices so that the quartz element is optically biased to exhibit quarter wave retardation midway in the band of wavelengths of light which it will transmit. By biasing the quartz plate mechanically to approximately one quarter wave retardation, the intensity of the light transmitted through the assembly will vary substantially linearly with the wave form applied to the modulating piezoelectric crystal.

The preferred axis of the quartz plate is oriented at 45° to the polarization angle of the crossed polarizers further to improve the efficiency of modulation. The preferred axis is determined by rotating the quartz plate between crossed polarizers until maximum modulation is observed.

The invention described herein also employs a signal detecting means to maintain the frequency of oscillation of the assembly at the resonant frequency to insure maximum modulation efficiency.

The invention is particularly useful in modulating the sample and reference beams in the spectrophotometer described in copending application, Ser. No. 801,227, filed Jan. 30, 1969, entitled "Rapid Scanning Spectrophotometer," now U.S. Pat. No. 3,521,958, issued July 18, 1970. Other uses for the device, such as for light communications systems, will be readily apparent to those skilled in the art.

Accordingly, it is an object of this invention to provide an improved light modulating device utilizing the stress-optic characteristics of an isotropic material which is made birefringent by the application of mechanical force to the material and wherein material is mechanically biased to provide one quarter wave retardation at the midway point in the range of wavelengths transmitted through the material; and to provide an improved light modulating apparatus of the type described above wherein a fused quartz plate having piezoelectric devices attached to opposite sides is mounted between crossed polarizing filters and wherein the assembly is mounted within a ring which is made adjustable in order to apply sufficient pressure to the quartz plate to render it, under static conditions, birefringent and to provide quarter wave retardation.

Other objects and advantages of the invention will be made apparent by the following description, the accompanying drawings and the appended claims.

BRIEF DESCRIPTION OF THE DRAWINGS

FIG. 1 is a perspective, exploded view showing a fused quartz element mounted between piezoelectric transducers, a metal housing which is adjustable to apply constant mechanical pressure to the plate, and an outer cover containing polarizing filters;

FIG. 2 is a cross-sectional view of the assembly, which also shows the fused quartz element, crossed polarizing filters, and the light path between a source and a light detecting element;

FIG. 3 is a graph showing the relationship between the intensity of the light transmitted through the assembly and the pressure applied to the plate; and FIG. 4 is an electrical schematic diagram of a typical oscillator circuit which may be used to supply signals to the modulating piezoelectric transducer.

DESCRIPTION OF THE PREFERRED EMBODIMENT

Referring now to the drawings which show a preferred embodiment of the invention, the light modulator assembly includes a light transmitting element 10 which is preferably formed from a cube of fused quartz, three-fourths inch on a side. Quartz is preferred although other materials such as $CaF_2$, for example, may be used to extend the range of the device to the infrared region of the spectrum. Fused quartz and $CaF_2$ are isotropic materials which may be made birefringent upon the application of mechanical force thereto.

The quartz cube 10 is placed in the light path between a first polarizing filter 12 and a second polarizing filter 13. The polarizing filters 12 and 13 are crossed, that is one of the filters has its polarization plane angle oriented at 90° to the other filter. Thus, the light passing from a source 15 is plane polarized by the filter 12, and polarized light then passes through the quartz element 10 where the light is circularly polarized by an amount depending upon the mechanical pressure applied to the quartz element. The resultant beam is then directed through the second polarizing filter 13, called the analyzer, and the intensity of the beam may be converted by a photoelectric transducer 17 into an electrical signal. The intensity of the beam is a function of the magnitude of the birefringence exhibited by the quartz cube 10.

The assembly includes a modulating means which is a piezoelectric drive element 20 mounted directly on the quartz cube 10. In the preferred embodiment, the piezoelectric drive element is a type PZT—5 ceramic crystal manufactured by Clevite Corporation. The piezoelectric device is a disc approximately 1 inch in diameter and one-quarter to one-half inch thick which has conducting plates formed on opposite surfaces thereof to which are attached wires 21 and 22. The size of the disc controls, in large part, its frequency of oscillation.

Mounted directly on the quartz cube on the side opposite the modulating means 20 is an energy detecting means which is also a piezoelectric ceramic disc 25, Clevite type PZT—5, from which extends a pair of wires 26 and 27. This piezoelectric element detects the acoustical wave transmitted through the quartz cube 10 from the modulating means 20.

A metal ring 30, which includes an upper member 31 and a lower member 32, comprises means for applying mechanical pressure to the quartz cube 10 to bias the element to approximate one-quarter wavelength retardation. This is done by tightening screws 33 and 34 which bring the two halves of the metal ring 30 together. Mechanical force is thus transmitted through rubber shock mounts 37 and 38 and the ceramic discs 20 and 25 to the quartz cube 10. The ring 30 also serves as the means for mounting the quartz cube in the light path between the polarizing filters 12 and 13.

The ring 30 is mounted in a plastic, cylindrically shaped housing 40 which includes an opening 41 for polarizing filter or analyzer 13. A circular cover plate 45 completes the housing. An opening 46 is provided in the plate 45 to receive the polarizing filter 12. The assembled device may be supported on a rod or shaft 48 which is received into and secured to the lower half 32 of metal ring 30.

The intensity of the light transmitted through the light modulating assembly will be a function of the mechanical stress applied to the quartz cube 10. In FIG. 3, the relationship between the light intensity passing through the assembly and the mechanical stress on the quartz cube 10 is shown by curve 50. When the mechanical stress biases the quartz cube to one-quarter wave length retardation, shown at 51, one-half of the light from the source 15 is then received at the photoelectric detector 17. When modulating light in the visible light range, the quartz cube 10 is mechanically biased to produce one-quarter wave retardation in the range of 5,400 A. to 5,800 A.

With the static mechanical stress constantly applied to the crystal, the piezoelectric device 20 is then activated to modulate the mechanical stress applied to the quartz cube. Curves 52 and 53 show two modulating inputs of different intensities and curves 54 and 55 illustrate corresponding variations in light output from the assembly. It has been found that the modulating efficiency of a device constructed in this manner can reach as high as 85 percent. It has also been found that the modulating efficiency is improved by orienting the preferred axis of the quartz cube 10 to approximately 45° to the polarization plane angle of the polarizing filters 12 and 13.

It has also been found that the quartz cube will resonant at several different frequencies, however, the one resonant frequency which appears to give the best modulation efficiency is the one which causes the quartz cube 10 to vibrate longitudinally between the modulating crystal 20 and the signal detecting crystal 25.

A circuit which has been found useful for modulating the quartz cube at its resonant frequency, even though the resonant frequency may drift due to temperature or other factors, is shown in FIG. 4. This is a simple tune-grid, tuned-plate triode oscillator in which the modulating crystal 20 is connected to the anode of a triode 60 and wherein the signal detecting crystal 25 is connected to the grid of the triode. A plug-in plate tuning circuit 61 and grid-tuning circuit 62 are also included so that the assembly can be made to modulate at any one of the various resonant modes available or where the resonant frequency of the entire assembly is changed in order to control the oscillating frequency. For example, in the rapid scan spectrophotometer described in the above mentioned pending application, Ser. No. 801,227, now U.S. Pat. No. 3,521,958 one such device is designed to modulate a light beam at 100 kHz. and the other device is designed to modulate another light beam at 150 kHz.

While the form of apparatus herein described constitutes a preferred embodiment of the invention, it is to be understood that the invention is not limited to this precise form of apparatus, and that changes may be made therein without departing from the scope of the invention as defined in the appended claims.

What is claimed is:

1. In apparatus for modulating the intensity of a beam of light including
   first and second polarizing filters mounted in optical alignment for the transmission of light therethrough, one of said filters having its polarization plane angle at 90° to the other said filter,
   a birefringent light modulating element mounted in the light path between said filters,
   modulating means mounted in contact with said element to transmit mechanical energy thereinto to vary the birefringence of said element, and
   energy detecting means mounted in contact with said element on the side opposite said modulating means for generating a signal responsive to the energy transmitted through said element by said modulating means for use in maintaining a frequency of oscillation of said apparatus at resonance,
   the improvement comprising
   means for applying an average mechanical pressure to said element through said modulating means and said detecting means to bias said element to approximate one-quarter wavelength retardation thereby to maximize the modulation efficiency of said apparatus.

2. The apparatus of claim 1 further including circuit means having an output connected to said modulating means and an input responsive to the output from said detecting means, said circuit means maintaining the frequency of modulation of said element at or near its resonant frequency to provide the highest modulation efficiency.

3. The apparatus of claim 1 wherein said birefringent light modulating element is fused quartz and wherein said element is mounted with its preferred axis orientated at 45° to the polarization angle of said first and second polarizing filters.

4. The apparatus of claim 1 for use with visible light wherein said element is mechanically biased to produce a one-quarter wave retardation in the range of 5,400 A. to 5,800 A.

5. The apparatus of claim 1 further including shock absorbing pads placed between said modulating means and said detecting means, the mechanical pressure to bias said element being applied through said pads and said modulating means and said detecting means to said element.

6. Apparatus for modulating a birefringent light transmitting element including
   modulating means mechanically attached to said element for modulating said element at or near its resonant frequency, and
   detecting means mounted in contact with said element on the side opposite said modulating means for generating a signal in response to the mechanical energy transmitted through said element,
   the improvement comprising
   means for applying pressure to said element through said modulating means and said detecting means to bias said element mechanically to approximate one-quarter wave retardation at a selected wavelength.

7. The apparatus of claim 6 wherein said modulating and detecting means are piezoelectric devices.